(12) United States Patent
Karani et al.

(10) Patent No.: US 11,755,400 B2
(45) Date of Patent: Sep. 12, 2023

(54) ERROR DETECTION AND MITIGATION FOR SOFTWARE PULL REQUESTS

(71) Applicant: salesforce.com, inc., San Francisco, CA (US)

(72) Inventors: Vijay Karani, San Francisco, CA (US); Tiffany Tuan, San Francisco, CA (US); Firas Saltaji, San Francisco, CA (US); Brian Whitten, San Francisco, CA (US); Dilip Pai, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 71 days.

(21) Appl. No.: 17/538,995

(22) Filed: Nov. 30, 2021

(65) Prior Publication Data

US 2023/0168960 A1 Jun. 1, 2023

(51) Int. Cl.
*G06F 11/07* (2006.01)
*G06F 11/30* (2006.01)

(52) U.S. Cl.
CPC ........ *G06F 11/0772* (2013.01); *G06F 11/079* (2013.01); *G06F 11/0757* (2013.01); *G06F 11/0793* (2013.01); *G06F 11/302* (2013.01)

(58) Field of Classification Search
CPC ............. G06F 11/0772; G06F 11/0757; G06F 11/079; G06F 11/0793; G06F 11/302
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |

(Continued)

*Primary Examiner* — Matthew M Kim
*Assistant Examiner* — Kyle Emanuele
(74) *Attorney, Agent, or Firm* — Schwabe Williamson & Wyatt

(57) ABSTRACT

Embodiments of the present disclosure relate to detecting and mitigating errors associated with software pull requests such as software deployment packages. The embodiments include identifying a failure of a pull request, identifying a system error associated with the failure, determining a failure mitigation process based on the failure and the system error, and executing the failure mitigation process to resolve the failure. The errors can be classified as system errors, user errors or planned downtime. The failure mitigation process can include generating an alert associated with the identified system error, updating a status of the pull request, re-evaluating the failure after a predetermined period of time, and retrying deployment of the pull request using an exponential retry process.

19 Claims, 8 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,430,229 B1 * | 8/2016 | Van Zijst ............. G06F 9/3844 |
| 10,708,420 B2 | 7/2020 | Karani |
| 10,795,662 B2 | 10/2020 | Gadgil |
| 11,170,381 B2 | 11/2021 | Karani |
| 11,245,789 B2 | 2/2022 | Karani |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2019/0130764 A1 | 5/2019 | Karani |
| 2019/0163664 A1 | 5/2019 | Karani |
| 2020/0137159 A1 | 4/2020 | Karani |
| 2020/0226056 A1* | 7/2020 | Haubold .............. G06F 11/3688 |
| 2023/0098474 A1* | 3/2023 | Bonic .................... G06F 17/18 |
| | | 714/38.1 |

* cited by examiner

ERROR DETECTION AND MITIGATION FOR SOFTWARE PULL REQUESTS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to detecting and mitigating errors associated with software pull requests (PRs). Other embodiments may be described or claimed.

BACKGROUND

Current software deployment life cycles utilizing a distributed public cloud deployment infrastructure system often encounter errors related to contiguous integration (CI) and contiguous deployment (CD) systems to deploy software updates known as pull requests (PRs).

One such category of errors includes system errors, which typically include intermittent and short-duration failures due to docker crashes and connectivity errors to dependent systems. Other system errors include relatively longer-term outages/incidents, such as persistent errors which take a longer timeframe (e.g., days, weeks, or longer) to resolve. System errors additionally may include planned downtime, or moratoriums, and release windows. Other categories of errors include user errors, which are primarily human errors in generating a request or validating the request before submitting it for deployment.

In conventional systems, errors from each of the above-identified categories may be logged to a database, however the burden to identify and mitigate all categories of errors falls to developers associated with the PRs. Embodiments of the present disclosure address these and other issues.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatuses, computer-implemented methods, and computer-readable storage media for detecting and mitigating errors associated with software PRs.

I. System Examples

Figure 1A:
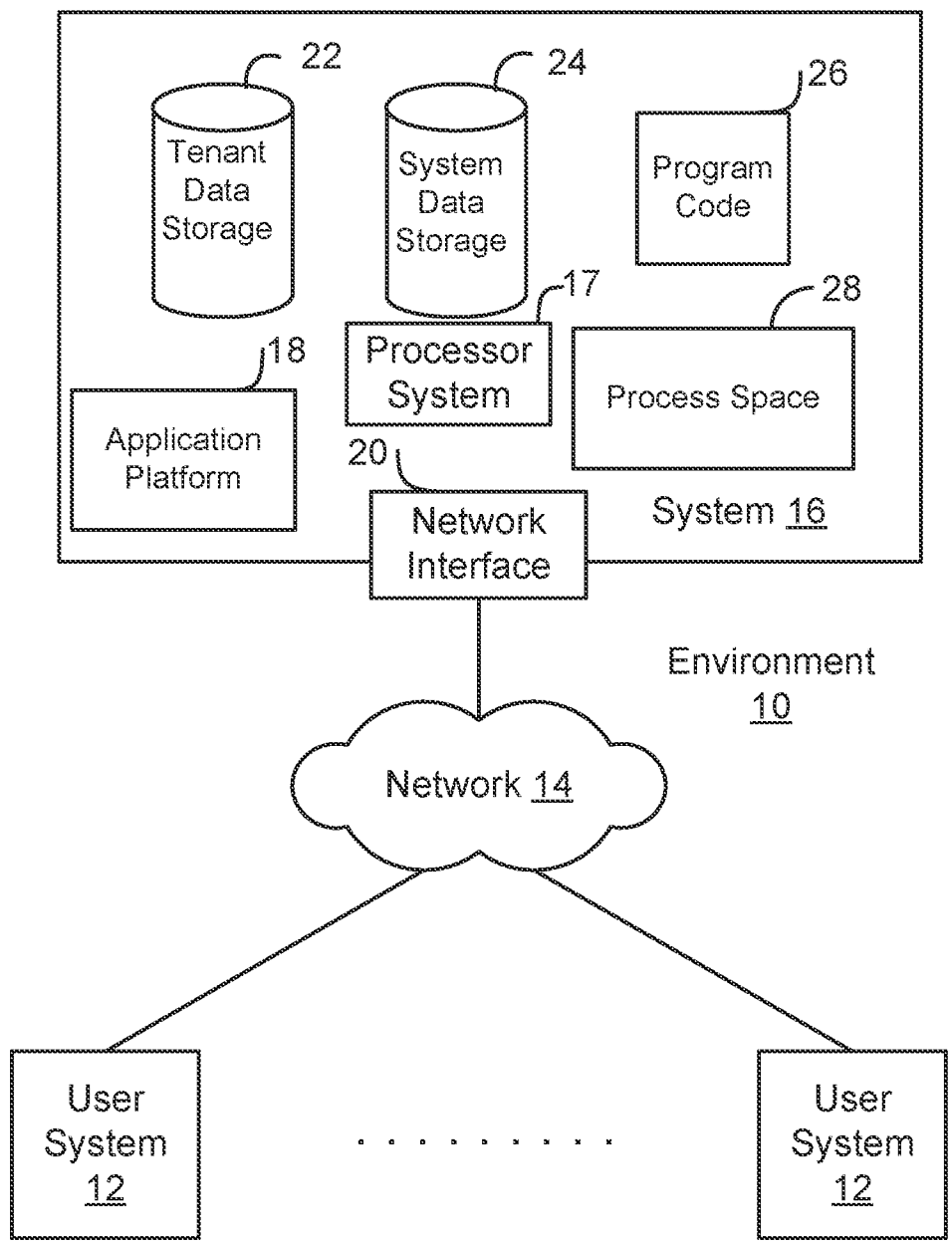
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
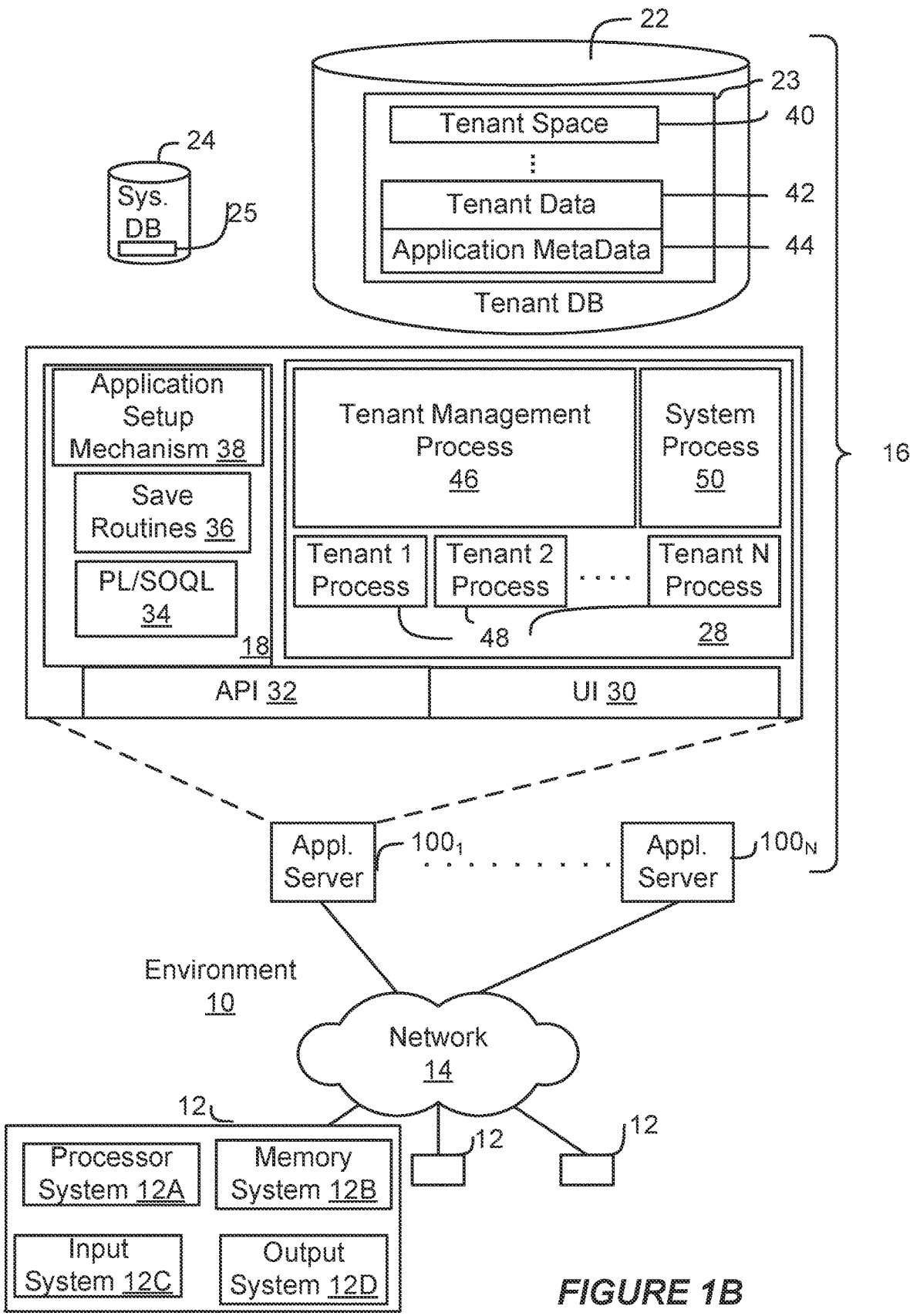
FIG. 1B is a block diagram illustrating examples of implementations of elements of FIG. 1A and examples of interconnections between these elements according to various embodiments of the present disclosure.

FIG. 1B shows a block diagram with examples of implementations of elements of Figure TA and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touch-screen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Error Detection and Mitigation for Software Pull Requests

As noted previously, in conventional systems, PR errors from different categories may be logged to a database, however the burden to identify and mitigate all categories of errors falls to developers associated with the PRs. Embodiments of the disclosure address this issue by automatically identifying system errors associated with a PR failure and determining an appropriate failure mitigation process. Among other things, this helps identify and mitigate one major category of errors associated with PRs, thus helping to alleviate the workload on human developers and reducing the time to deploy the PR.

Figure 2:
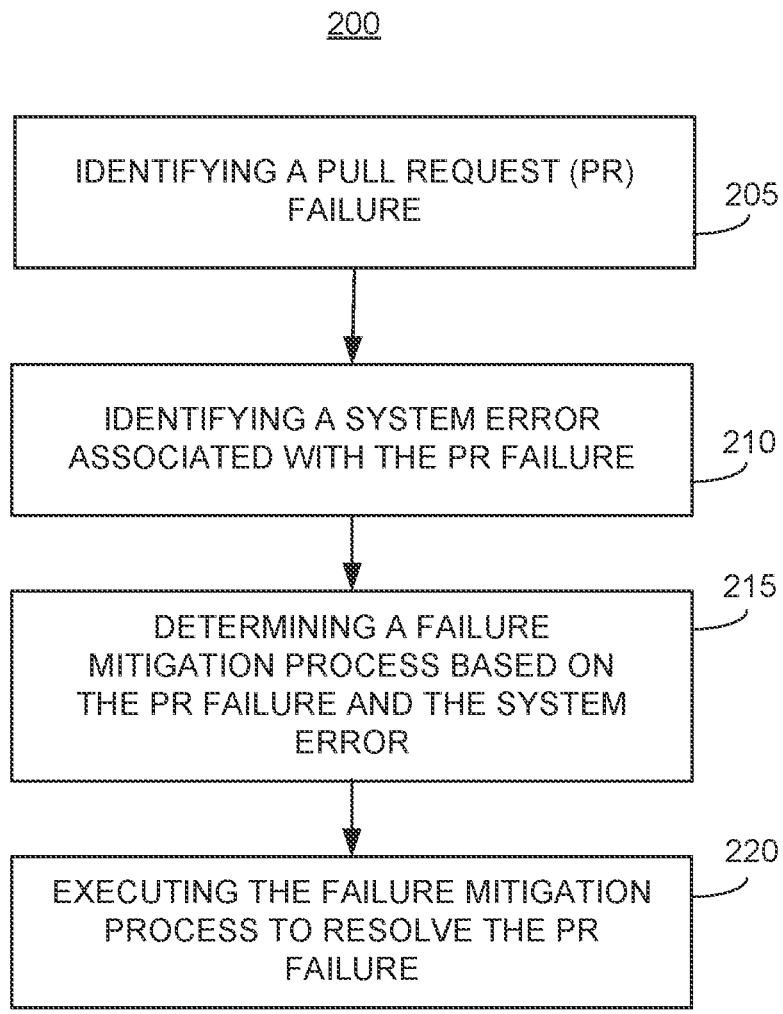
FIG. 2 is a flow diagram illustrating examples of a process according to various embodiments of the present disclosure.

FIG. 2 is a flow diagram illustrating an example of a process 200 according to various aspects of the present disclosure. Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Process 200 may be performed (in whole or in part) by a database computer system (such as database system 16 depicted in FIGS. 1A and 1B), a user computer system (such as user system 12 in FIGS. 1A and 1B), or by a combination of a database system and user system operating in conjunction with each other (e.g., via network 14 in FIGS. 1A and 1B). In this example, process 200 includes identifying a pull request (PR) failure, the PR including a software deployment package (205); identifying a system error associated with the PR failure (210); determining a failure mitigation process based on the PR failure and the system error (215); and executing the failure mitigation process to resolve the PR failure (220).

In some embodiments, a contiguous integration/contiguous development (CI/CD) system may be implemented using the systems described in FIGS. 1A and 1B. The CI/CD system may be used to implement a deployment life cycle for a software package associated with a PR. In particular, a distributed public cloud deployment infrastructure system may provide CI to create deployable artifacts (e.g., rpm, zip, helm, terraform) and CD that provides a deployment pipeline trigger. The CI/CD system may further provide post-deployment validation and verification after validation.

The CI/CD system may identify a PR failure (205) that includes a software deployment package (205). In some embodiments, errors in the CI/CD system may be classified into three categories: user errors, system errors, and planned downtime, such as moratoriums and maintenance windows.

User errors typically include failures based on a pull request in a software tracking framework (e.g., Git) created by the user. Such errors may include a failed validation, failed unit test checks, merge conflicts (e.g., between a software code in the software deployment package of the PR and existing software code), or approval from a wrong user.

System errors may include intermittent and short-duration failures due to docker crashes and connectivity errors to dependent systems such as repository managers (e.g., Artifactory), software tracking frameworks (e.g., Git), data visualization software (e.g., SOMA), etc. System errors may also include relatively long-duration outages or incident errors, and can include persistent errors which take a longer timeframe (e.g., days, weeks, or longer) to resolve.

Each of the component systems of the CI/CD pipeline presents an inherent challenge to fail. This puts the burden of recovery on developers to determine in which part of the pipeline their change failed, and what the next steps should be to recover. Most often, the simplest (and unfortunately the longest) solution is to restart the entire process from scratch. With the inherent customization of the CI/CD pipeline subsystems, there is a lack of available solutions in the industry to automate the recovery from system errors and long duration outages/maintenances.

As described in more detail below, embodiments of the present disclosure help systems recover from various failure scenarios based on user need and provides resiliency in terms of managing the CD pipeline. For example, in some embodiments if a deployment failed because of unavailability of data center (maintenance window or outage), embodiments of the present disclosure can identify this issue and hold the deployment until the resource is available and a post-deployment is appropriate. In another example, if a deployment fails in a CI pipeline because of a CI system crash, embodiments of the present disclosure may self-run and auto-recover from the failure.

Figure 3:
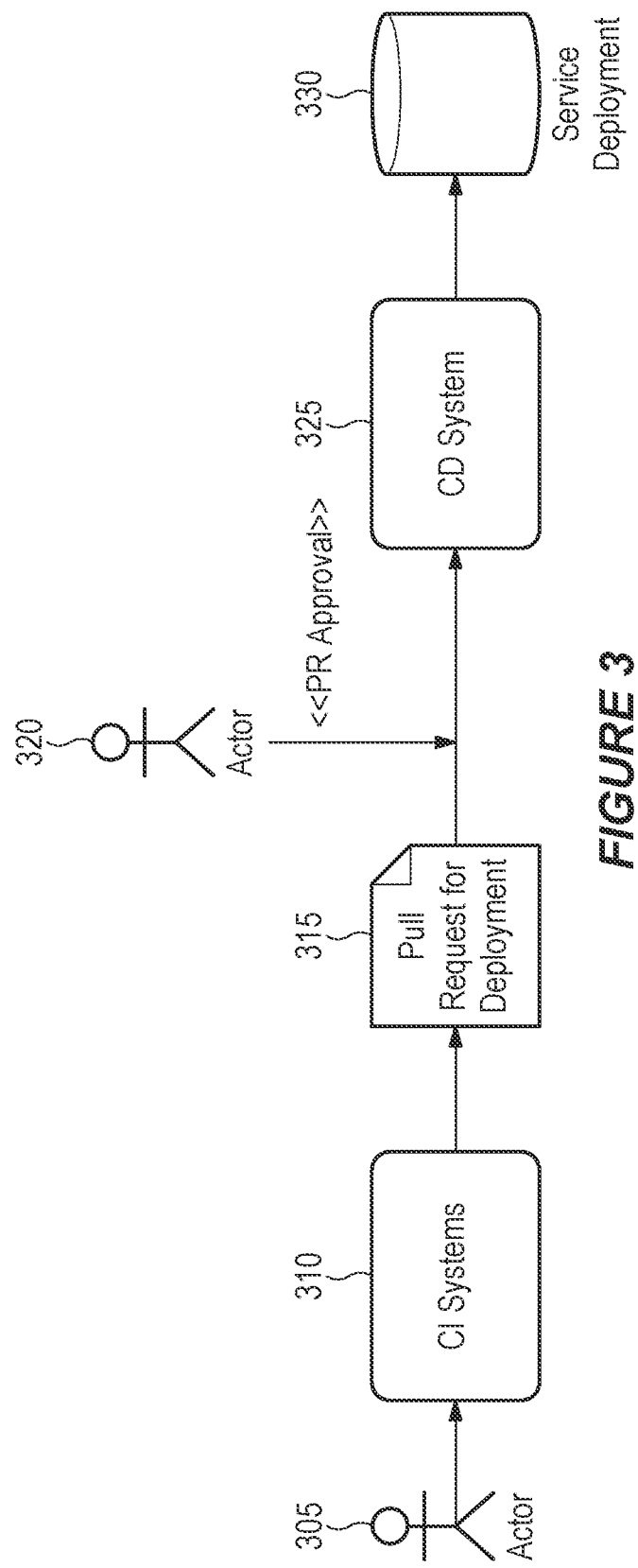
FIG. 3 illustrates an example of a CI/CD system for artifact deployment according to various embodiments of the present disclosure.

FIG. 3 illustrates an example of a CI/CD system for artifact (e.g., software package) deployment in accordance with various embodiments. In this example, a first actor 305 is a developer who submits a code change to a contiguous integration (CI) system 310, as introduced above. The responsibilities of the CI system 310 include generating a build artifact which can be deployed. Some examples of build artifacts include: an rpm package, a terraform package, a helm package, a zip package, or other deployment artifacts.

The successful completion of CI system creates a pull request (PR) 315 that includes the software deployment package. The deployment PR request is sent for approval to a second actor 320. The second actor 320 may include a human or an automated system (or both) that verifies the details of the deployment. Some systems can optionally choose to deploy the artifacts to a Canary system, where it would run automated testing to verify the deployment artifacts. In some embodiments, the second actor 320 may be optional.

If the PR is rejected/not approved for deployment, it is an indicator of a bad deployment or failure of automated tests, or other reasons for deployment of the artifact in production. If the PR is approved, it is provided to a continuous deployment (CD) system 325 to process the PR. In some embodiments, such processing may include evaluating the PR to resolve conflicts and merging the deployment changes. The artifacts are tagged and stored for future reference in a service deployment database 330, and a deployment pipeline is triggered for installing the artifact image on the system. After the successful installation of the artifacts, the system or service is available with the new artifact version.

Embodiments of the present disclosure may operate in conjunction with a variety of different CD systems. In some embodiments, the CD system may be divided into multiple components based on the responsibility of the respective components. Each component of the CD system (also referred to herein as a "microservice") may run independently of other microservices. In some embodiments, the CD system may be a stateless service that communicates with other microservices using a queue mechanism. Some details associated with examples of microservices that may operate in conjunction with embodiments of the present disclosure are provided below.

Intake Microservice: In some embodiments, the intake microservice gets triggered by an event created by a deployment pull request (PR) in terms of approval. This makes the entire CD pipeline validation run. The intake microservice validates the PR, and pushes the PR to the queue so the PullRequest microservice can process the PR.

PullRequest Microservice: In some embodiments, validations may be run on the deployment PR—such as validations associated with the CD system as well as customer-provided validation scripts. Customers or service owners can write their own validations to ensure that their PR passes the deployment validation, conforms to their policy restrictions, and meets other needed criteria. The CD system may run its own check to ensure that the PR does not have any conflicts with the existing files in the software tracking repository (e.g., git repo). After its basic validation, the CD system runs the customer script to verify that the pull request provided by the service owner is deployable. Once all checks, are done. The PullRequest microservice merges the PR, and passes the control to the Packaging microservice via a queue.

Packaging Microservice: Once the CD system completes the PullRequest validations, it runs the packaging microservice. The CD system provides flexibility to the Service Owner (SO) to create a custom package which can be provided by the SO in package_script. The packaging microservice runs the package_script, and creates the deployment package. Once the deployment package is completed, the CD system stores the package to a package storage database (e.g., a public cloud storage like s3 buckets or corporate storage like artifactory storage—jfrog). Once the deployment package is created, it may pass control to the promotion microservice by posting an event in the queue.

Promotion Microservice: The Promotion microservice picks up the deployment package from the package storage database, and deploys the package to data centers (e.g., corporate data centers, or artifactory DC hosts; or to public cloud data centers like aws-regional storage systems). For corporate internal data centers and public cloud systems, a suitable promotion microservice may be run. In some embodiments, a promotion microservice may perform the promotion of artifacts to data centers. In other embodiments (in a public cloud deployment model, for example), a replication or promotion service may perform the promotion of artifacts across multi-regional cloud infrastructure instances.

In addition to the microservices above, embodiments of the present disclosure may provide a new microservice (also referred to herein as a "crawler") that manages the recoverability of failed PRs in case of events such as moratoriums, incidents, release windows, or any abnormal system failures of the system due to hardware/software resources.

In some embodiments, a PR may include the following lifecycle steps:

1. Code changes by developer;
2. Creating a PR for merge and creation of artifacts for deployment;
3. Submit the PR for approval;
4. Auto-approval from the software tracking repository (e.g., git repo) or self-approval or team-based approval starts the lifecycle of artifact creation to deployment;
5. Approval or Auto-approval triggers the distributed CI/CD service to process the PR (e.g., intake microservice);
6. PR evaluation for resolving conflicts before merging the code, and running additional validations needed before merging the code (e.g., PullRequest microservice);
7. A success provides the ability to merge the PR content; and
8. Performing the merge;

In some embodiment, the crawler may be implemented to guarantee dependent PRs where ordering is critical in case of some software tracking repository deployment lifecycle (e.g., gate-definitions deployment) where PRs are dependent on earlier PRs. In some embodiments, a customer or other user may provide a flag to indicate the priority of the PR.

In some embodiments, the crawler may identify PR failures (205) by monitoring a software tracking repository for the status of PRs. In some embodiments, if a PR is canceled for further processing, the crawler stops further processing of the PR for system related errors.

The crawler may classify errors according to categories (e.g., user errors, system errors, and planned downtime errors) as introduced above. The error classification system can be a part of the crawler microservice or part of a separate component. Referring again to FIG. 2, the system may utilize error classification to determine (215) and execute (220) a failure mitigation process to resolve the PR failure.

For example, the system may categorize errors based on known patterns and history of previous errors. The system may also utilize machine learning to identify new/unknown errors and characterize them to help identify similar errors in the future. The system may perform various actions and recovery mechanisms associated with the failure mitigation process based on a determined error category.

In some embodiments, for example, the failure mitigation process may include generating and sending an alert associated with the identified system error. In a particular example where the system error is associated with an outage, the user base associated with the PR may be sent an alert via: a support channel post (e.g., a third party team support channel if the outage is due to a third party issue), a short message service (SMS) text message, an email, or an online incident response service, as well as via any other suitable communication.

In some embodiments, the alert may include an indication of a status of the PR, an error type, an error category, or other suitable information associated with the PR and the nature of the error. The system may also, as part of executing the failure mitigation process (220), update a status of the PR to indicate: the error type, the error category, or an indication of the failure mitigation process being performed. In this manner, users can be automatically apprised, in real-time or near-real-time, of the status of the PR error and the failure mitigation process to address it.

In some embodiments, the system may determine that the nature of the error is such that it is appropriate to retry deployment of the PR at its previously-failed stage (e.g., after a predetermined cool down period to allow the error to be corrected). In some embodiments, the failure mitigation process may include re-evaluating the PR failure after a predetermined period of time to determine if the system error is still present before attempting a retry.

The system may also determine an expected duration for the error, which can be communicated via the alerts to users as well as used as a basis upon which to determine or execute the failure mitigation process. For example, in a case where the system determines an outage will likely exceed a predetermined number of hours, the system may alert a support team via an online incident response service (e.g., PagerDuty).

As noted above, the system may utilize machine learning applied to the error classification, so the crawler self-learns and can recognize new errors as they occur in the future. Embodiments of the present disclosure may utilize a variety of self-learning algorithms to identify errors associated with PRs, as well as effective failure mitigation processes with which to address them.

For example, in some embodiments the crawler may query an internal engineering system for system failures or incidents, moratoriums, or release windows. If no system errors or release blocks have been reported for any system related to the correlation of the error, the system may map the failure to an intermittent failure and retry deployment of the PR using an exponential retry process. In another example, if an incident has been reported for an internal engineering system, the crawler may provide the status on the PR (e.g., via an alert to a service team as described above), and put the PR in the wait system for processing.

FIGS. 4A, 4B, 4C, and 4D illustrate examples of solutions for distributed CI/CD-FCP content (Fast Content Pipeline) systems in accordance with various embodiments of the present disclosure.

Figure 4A:
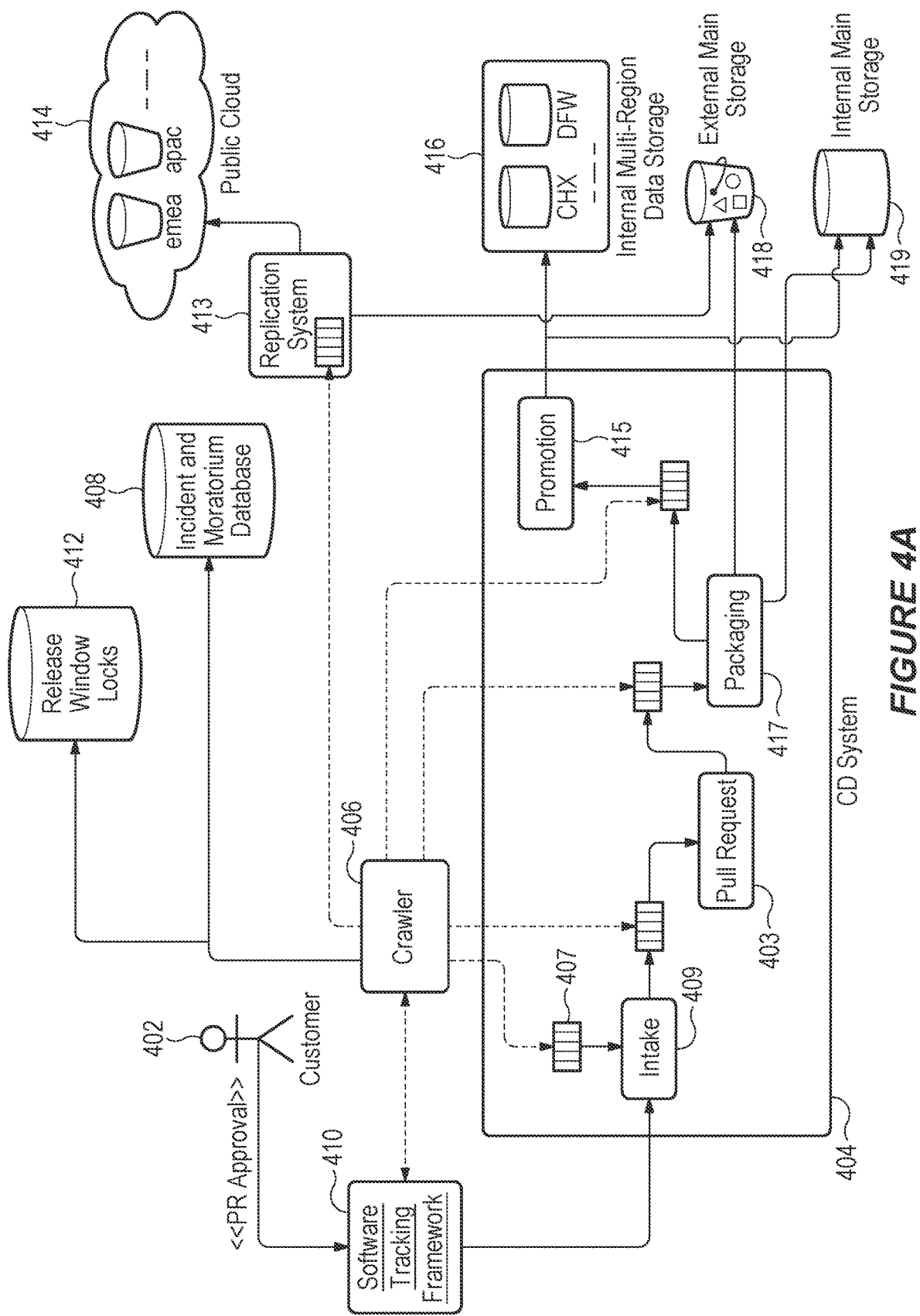
FIGS. 4A, 4B, 4C, and 4D illustrate examples of CI/CD systems using fast content pipeline artifact content according to various embodiments of the present disclosure.

FIG. 4A illustrates an example of a CD system utilizing stateless crawling in accordance with some embodiments. In this example, a service owner (not shown), or the CI system creates the deployment PR. The PR or the customer 402 approves the deployment PR, which creates the event in a software tracking (e.g., git) framework 410, and triggers a CD system 404 to start the deployment lifecycle. The system in FIG. 4A further includes a crawler microservice 406, which runs independent of other microservices. The crawler microservice 406 has the ability to input events in each of the microservice queues. For example, the intake microservice 409 has a queue 407, in which the crawler microservice 406 can input a queue event.

Each of the microservices operate to implement the CD system. When a PR fails, it reports the failure on the PR. The crawler microservice 406 scans all repositories (e.g., databases) served by the CD service 404, and reads all open PR's which are being processed by the CD service 404. The crawler microservice 406 has connectivity to the incident and moratorium database 408, which is maintained by a site-reliability team or incident management team to keep track of all incidents or system related outages. Additionally, the crawler may scan the release windows locks database 412, which is maintained by the product release teams and stores information associated with locks that prevent software production releases. The database 408 provides detailed information for all the incidents and moratoriums in the system. In this manner, the crawler 406 can scan a first database (e.g., a repository served by the CD service 404) storing information on a failed PR to identify a PR failure, and scan a second database (e.g., incident and moratorium database 408) storing information associated with system-related incidents and outages in order to identify a system error associated with the PR failure. The crawler 406 may similarly scan additional databases, such as the release windows lock database 412, which identify any defined deployment rules.

As the crawler 406 detects failed PR's, it reads the failure reason, and starts processing the PR if the PR failed due to system error. If the crawler 406 determines the PR failed due to system error, it classifies the system error and, based on the classification of the error, determines how to further proceed with a failure mitigation process to address the error. For example, if the failure mitigation process includes re-triggering or redeploying the PR subsequent to the system error being cleared or resolved, the crawler 406 may add the PR back to the microservice queue for re-processing based on which microservice reported the error. A pull request microservice 403 verifies that the pull request is deployable and (if so) merges the PR, and passes the control to the packaging microservice 417 via a queue.

In some embodiments, all microservices can register the processing PR to the crawler 406, so the crawler can avoid needing to scan all the repos to identify a PR failure. Additionally, the crawler service 406 can store information regarding the failed PRs so if the problem or failure is not cleared, it knows to process the failed PRs. One advantage of a stateless crawler is there is no state dependency, or any storage dependency.

In some embodiments, each microservice processing CI/CD events publishes log messages to PRs stored in version control (e.g., GitHub Enterprise). Thus the PR metadata in the version control system becomes a source of state for the crawler to determine what action to take. In some embodiments, the crawler service 406 has a registry of the git repos that it services, so it is scanning the repos and the open pull requests to see the reasons of failed PRs.

The microservices may adhere to the requirements of the error classification system when updating pull request metadata in git, in order for the crawler 406 to properly parse the state and take action. Using an error classification system, the crawler 406 can determine in which microservice the failure occurred. For example, the crawler 406 may classify whether the failure is a system error, a user error, or a longer-duration event like moratoriums, incidents or release windows.

In some embodiments, if the crawler 406 determines the error is a user error (e.g., due to user actions associated with the PR) such as a build error, merge conflict, or other user errors, the crawler 406 may determine to not process such errors. In the event of a system errors (such as an Open Container Initiative (OCI) docker exception, intermittent network connectivity failure, network bridge (e.g., site-bridge) failures, or a proxy system failure (e.g., to git.soma or artifactory), the crawler 406 may add a PR back into the respective micro-service queue to be reprocessed. In the event of a moratorium, the crawler 406 may query the system for clearance. Attempts of the crawler 406 to retry may be based on follow-up user based actions that is received from the PR. For example, if a user decides to close the PR, no further processing will be done on the user's behalf, but if the user leaves the PR can be scanned during the next git repo scanning.

In the examples depicted in FIG. 4A (and similarly depicted in FIGS. 4B-4D), a replication (or promotion) system 413 replicates deployment artifacts across multi-region data storage systems in the public cloud 414, which shows examples of data storage for emea (Europe, Middle East, and Africa) and apac (Asia Pacific). Similarly, a promotion microservice 415 stores deployment artifacts in an internal multi-region data storage 416, which shows examples of data storage for Chicago (CHX) and Dallas-Fort Worth (DFW). Packaging microservice 417 and promotion microservice 415 are also coupled to an external main storage 418 and internal main storage 419 for storing content packages. In some embodiments, a replication system or microservice may be used to perform a blind copy of artifacts from one region to all regions. In some embodiments, a promotion system or microservice may include a replication engine which knows which regions it appropriate to replicate the artifacts.

Figure 4B:
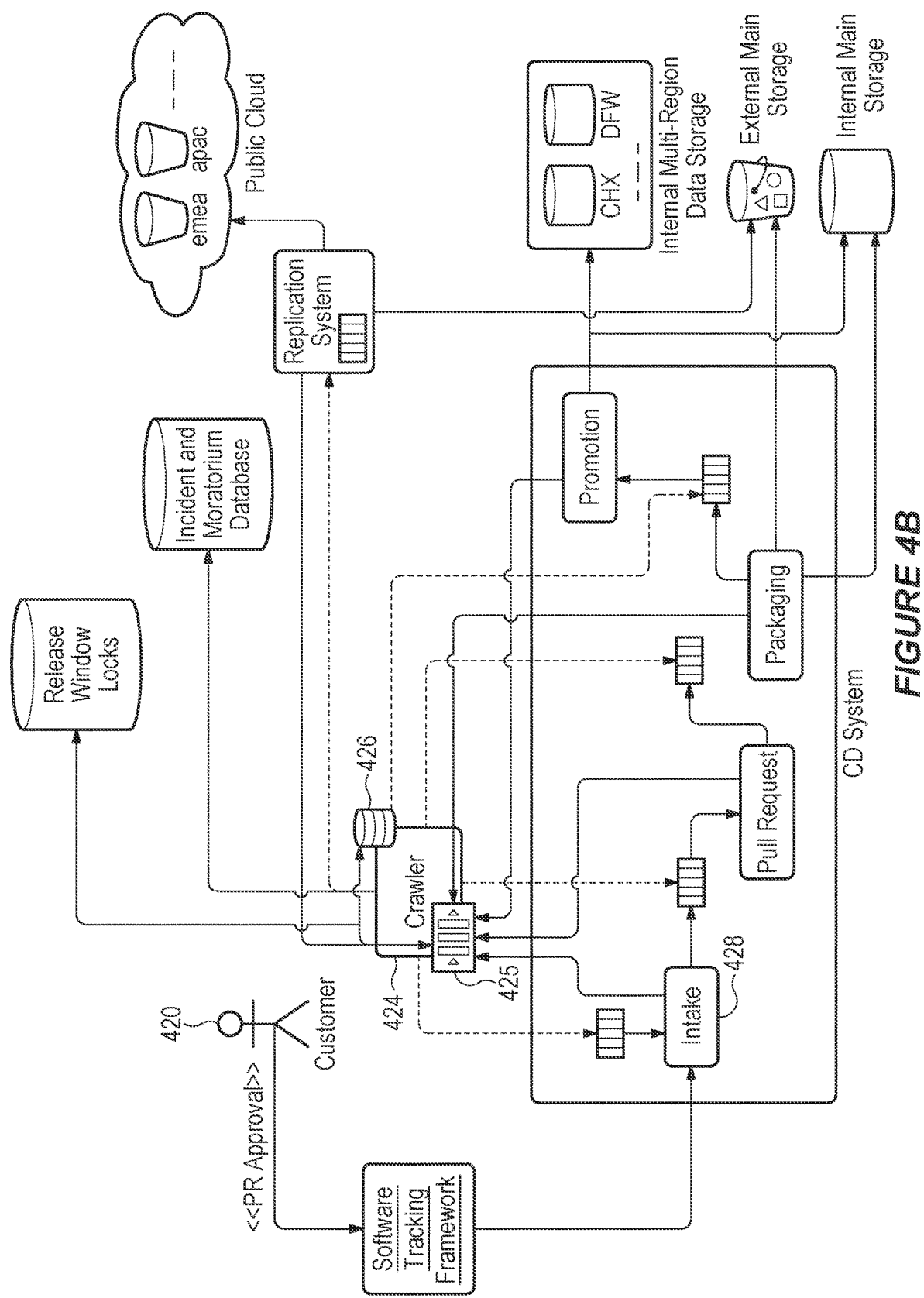

FIG. 4B illustrates an example of a stateful independent crawler service in accordance with various embodiments. In this example, an actor labeled "Customer" 420 is a developer submitting a code change through a CI system for deployment via a CD system. FIG. 4B provides a centralized crawler design architecture, where all microservices have connectivity to the centralized crawler 424 via the crawler queue. The failed PRs are reported to the crawler 424 to determine a failure mitigation process for further processing of the PR. Among other things, reporting the failed PRs to the crawler 424 helps avoid the time expense of crawling the repos searching for failed PRs. In some embodiments, an additional cost is incurred in terms of queue, and may need additional storage for managing the PRs.

In the example depicted in FIG. 4B, the crawler 424 maintains a persistent storage system 426 (such as a RDBMS) to enable reliable processing of failed PRs, storing the details of in-flight PRs along with the associated microservice currently processing the PR. For example, if there is an on-going moratorium which is going to last an extended period (e.g., one week), the crawler 426 may store the PRs in a database 426, instead of maintaining it in the queue.

An API 425 for registering PR events is exposed by the crawler 424 to provide a standard interface for microservices to integrate with the crawler system. In some embodiments, when processing a given PR, each microservice will update the crawler API 425 with information regarding the latest/current stage of processing for the PR. In some embodiments, a microservice may include an indication of a failure category associated with a PR failure. This information includes enough detail for the crawler 424 to re-enqueue a PR for processing in the event of a designated failure category. The crawler 424 will also maintain information on PR submission time, in order to re-enqueue in the proper sequence following an extended outage or moratorium when many PRs are in an error state. When the PR is done being processed by a given microservice, the microservice will call the crawler API 425 to indicate completion for that stage of processing.

In some embodiments, the determination of the failure mitigation process to pursue may be delegated to an error classification system, which can be configured by the system owner to classify errors as user, system, or moratorium error types. In the case of user errors, the crawler 424 will not re-enqueue PRs. In the case of system errors, the crawler 424 will re-enqueue the PR to the queue of the microservice that registered the error event. In the case of moratorium errors, the crawler 424 will periodically query a moratorium service (or configuration file) until the moratorium is lifted. PRs that are paused due to moratorium will be re-enqueued in the same order received. Additionally, the crawler 424 can periodically check for in-flight PRs which have exceeded a configurable threshold time in a single microservice, and then conditionally re-enqueue the PR with that service based upon the system owner's requirements.

A state-based design for the crawler 424 may be implemented in any suitable manner. For example, in some embodiments the crawler 424 maintains an internal repository (which could be a database, or a queue holding the events) to maintain the PRs that are processed by CI/CD systems. The design of database is ideal for long term outages or incidents on the system. Additionally, the crawler 424 may maintain the ordering of PR dependencies for deployment. For example, https://<orgname>/<reponame>/PR/1 will be processed before https://<orgname>/<reponame>/PR/2.

In some embodiments, each microservice registers a PR event to the crawler service 424. For example, as soon as the intake microservice 428 gets triggered from the PR lifecycle, the intake service 428 registers the PR event to the crawler service 424. The event passing can be done either via a queue, or a pub/sub model. This event is logged into the crawler service 424. The crawler 424 actively processes and monitors the health of the system in terms of outages/incidents. This helps in driving the lifecycle of the PR. In some systems, the crawler 424 can act as a super-controller at the intake level and fail the entire PR if it realizes that there is a release lock window for all systems (e.g., as specified by the release window locks database described above).

Each microservice of the distributed CI/CD architecture may provide an update to the status of the processed event to the crawler microservice 424. Using an error classification system, the crawler 424 identifies if the failure is due to a user error, system error, moratorium, or release window lock. In the case of a user error, the crawler 424 does nothing. In the case of system errors, the crawler 424 puts the PR for processing in the respective microservice queue. In the case of a moratorium or release window lock, the crawler 424 queries the system, and holds the PR until it receives clearance for the respective moratorium based event. The respective status is provided on the PR. If the user decides to close the PR, the event will be removed from the crawler processing. The crawler 424 will attempt to try the PR processing based on the clearance received for moratorium-related outages or release window locks. In some embodiments, when a PR is closed the event is removed from future processing.

Figure 4C:
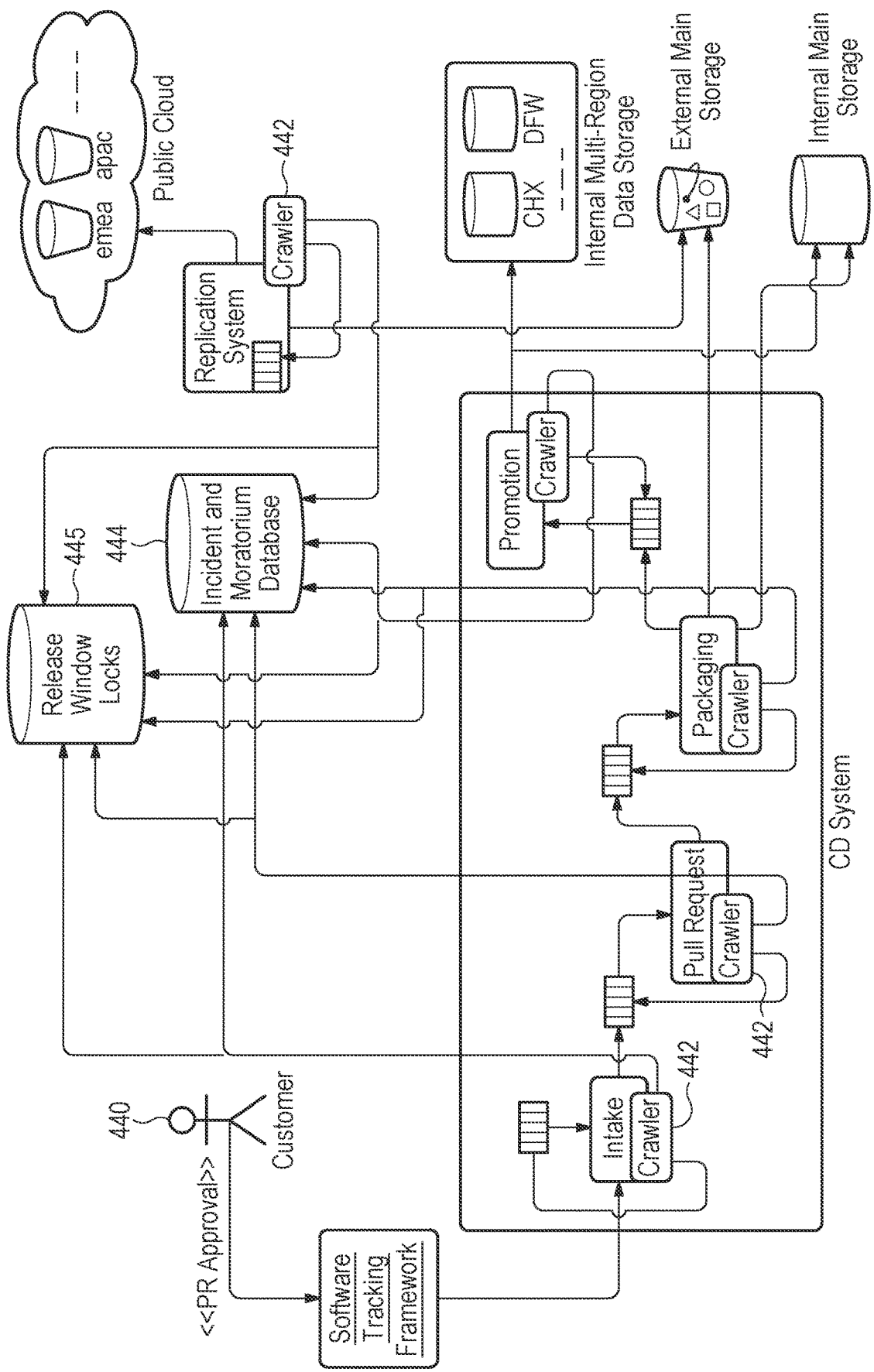

FIG. 4C illustrates an example of a stateful built-in crawler within a CI/CD service. In this example, the actor 440 labeled "Customer" is a developer submitting a code change through a CI system for deployment via a CD system. In this model, a crawler instance 442 is coupled/built-in with each microservice and processes only PR error events for that specific microservice.

Each crawler component 442 or microservice retrieves information from the incident and moratorium database 444 for the system errors, and from the release windows locks database 445 regarding release window locks. The crawler instances 442 each maintain a local persistent storage system to enable reliable processing of failed PRs. An API (not shown) for registering PR events is exposed locally by each crawler 442 to provide a standard interface for microservices to integrate with the respective crawler systems 442.

When processing a given PR, each microservice will update its local crawler API with information regarding the status of processing for this stage of the CD system. This information includes enough detail for the local crawler 442 to re-enqueue a PR for processing in the event of a designated failure category. The local crawler 442 will also maintain information on PR submission time, in order to re-enqueue in the proper sequence following an extended outage or moratorium (e.g., when many PRs are in an error state).

When the PR is done being processed by a given microservice, the microservice will call the local crawler API to indicate completion for that microservice. In the case of an error, the determination regarding the failure mitigation process for the local crawler 442 to execute may be delegated to an error classification system, which can be configured by the system owner to classify errors as user, system, or moratorium error types. In the case of user errors, the local crawlers 442 will not re-enqueue PRs. In the case of system errors, a local crawler 442 will re-enqueue a respective PR to the queue of the respective local microservice. In the case of moratorium errors, the local crawler 442 will periodically query a moratorium service (or configuration file) until the moratorium is lifted. PRs that are paused due to moratorium or release window lock will be re-enqueued in the same order received. Additionally, the local crawlers 442 can be configured to periodically check for in-flight PRs which have exceeded a configurable threshold time, and then conditionally re-enqueue the PR based upon the system owner's requirements.

The self-built-in crawler state design shown in FIG. 4C may be implemented in any suitable manner. For example, in some embodiments each of the respective microservices self-maintain the crawler portion 442, where it is able to make the decision if the event needs to be re-processed after failure attempts, or needs to be stored for future processing. Each built-in crawler 442 maintains an internal repository (which could be a database for holding the un-processed events). The design of database is ideal for long term outages or incidents on the system. The design shown in FIG. 4C may include the packaging microservice (at a minimum) being aware of the health of the endpoint in terms of long term outages or incidents of the system.

In some embodiments, each microservice of the distributed CI/CD architecture provides the update to the status of the processed event to its own crawler 442. The respective crawler 442 decides if the failure is due to a user error, system error, moratorium, or release window lock. In the event of a user error, the crawler 442 does nothing. In the event of system errors, the respective crawler 442 may put the PR for processing in the respective microservice queue. In the event of a moratorium or release window lock a local crawler 442 queries the system, and holds the PR until it receives clearance for the respective moratorium based event. The respective status is provided on the PR. If the user decides to close the PR, the event will be removed from the crawler processing. The crawler 442 will attempt to try the PR processing based on the clearance received for moratorium related outages.

Figure 4D:
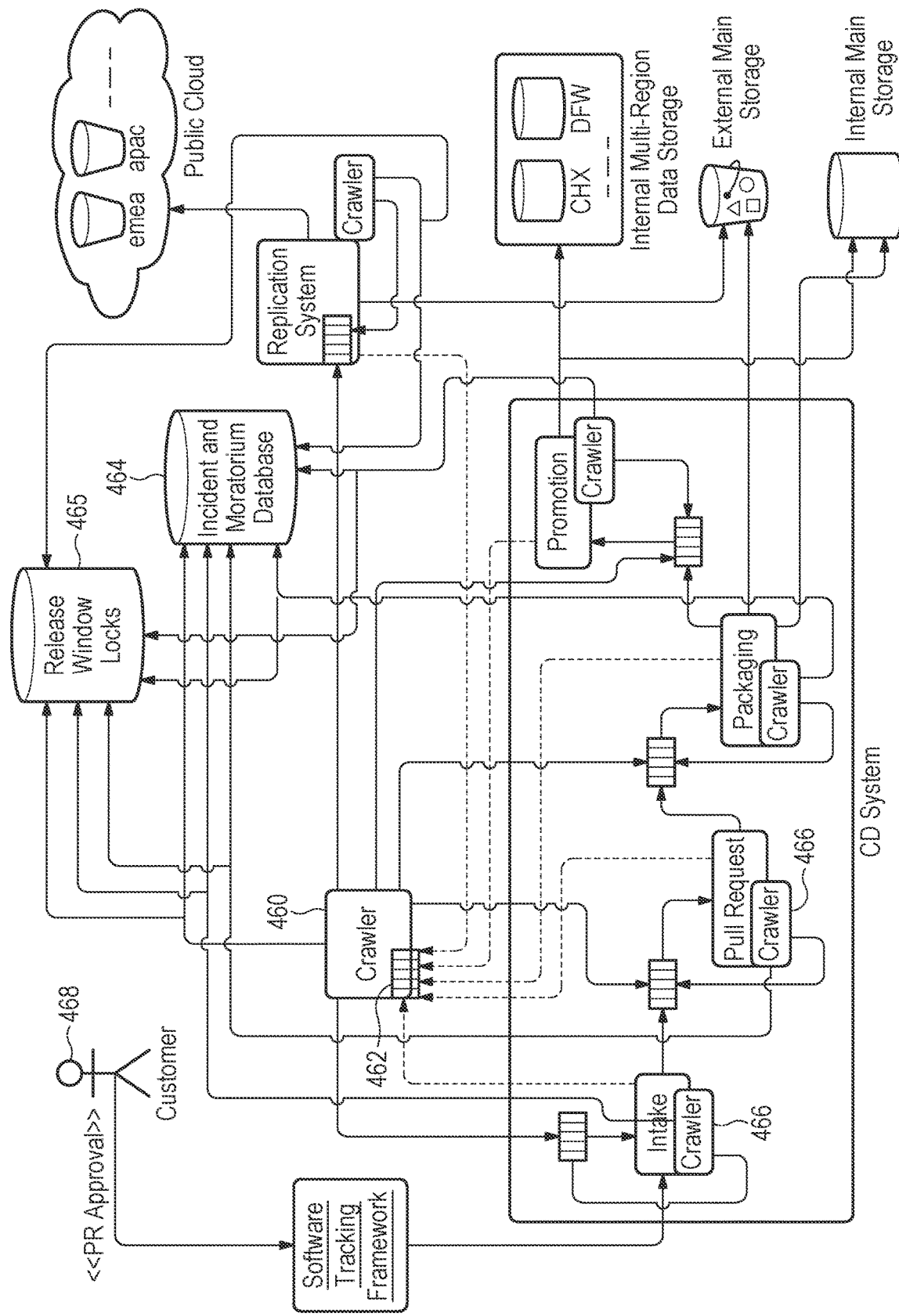

FIG. 4D illustrates an example of a controller-agent crawler system, or controller-controller (e.g., multi-controller) crawler system. The system in this example helps provides the flexibility to the individual microservices to be decision makers in terms of the PR failure. Each respective crawler microservice 466 can decide if it was an intermittent failure, and can be resolved by exponential retries or wait for a predetermined period of time (e.g., 5 minutes). In some embodiments, a crawler microservice 466 can put the event back in its own queue for re-processing. If a crawler microservice 466 realizes that the event would be better processed by the crawler controller 460, it would add the event to the crawler controller queue 462 for processing.

An example of a case where a crawler microservice 466 may defer the handling to the controller crawler service 460 may include a situation where an incident is expected to last an extended period of time (e.g., 12+ hours), and will need to be monitored frequently since there is no guarantee that it actually be resolved within 12 hours. Additionally, if the system needs to contact or page an external third party service which needs to clear the system error, it can defer that to the controller crawler 460. The main controller crawler 460 has connectivity to the incident and moratorium database 464 and release window lock database 465 to track the constant monitoring of incidents, moratoriums, and release window locks. The crawler components within each microservice may also have connectivity to the monitoring database.

In FIG. 4D, the actor labeled "Customer" 468 is a developer submitting a code change through a CI system for deployment via a CD system. When processing a given PR, each microservice will update its local crawler API with information regarding the status of processing for this stage of the CD system. In the case of an error, the decision for what action the local crawler 466 will take as part of a failure mitigation process may delegated to an error classification system, which can be configured by the system owner to classify errors as user, system, or moratorium error types.

In the case of user errors, the local crawler 466 will not re-enqueue PRs. In the case of system errors, based on the system error classification and its limited decision-making, the local crawler 466 may decide to re-enqueue a PR for processing as part of the failure mitigation process. If the information is not enough to make a decision, or the time for resolution for the PR is greater than the microservice queue processing, the local crawler 466 may push the PR event to the controller crawler 460 for monitoring and requeue when appropriate. The controller crawler 460 will periodically query the database 464 for resolution or clearing of the event for it to process the PR, and re-enqueue it back to the appropriate microservice. PRs that are paused due to moratorium will be re-enqueued in the same order received.

Additionally, the local crawlers 466 can be configured to periodically check for in-flight PRs which have exceeded a configurable threshold time, and then conditionally re-enqueue the PR based upon the system owner's requirements. In the example shown in FIG. 4D, the individual microservices (like the Intake, PullRequest, Packaging, and Promotion microservices) can register every PR before starting the processing on the PR. The controller crawler 460 can act as a watchdog monitoring for PRs or identify a particular microservice getting stuck at a particular stage of PR processing. The controller crawler 460 can act as a supervisory service which kills the processing of the service which gets stuck, or exceeds a specific duration for processing of the PR.

Embodiments of the present disclosure may also be implemented as variants to the distributed systems design shown in FIG. 4D. For example, some embodiments may be implemented using a controller-agent architecture, where a controller crawler handles the long-duration system errors and planned downtime related approvals. The controller crawler may delegate the intermittent, and shorter duration retry mechanism related system errors to the agent crawler system. In another example, some embodiments may be implemented in a leader-leader architecture, in which each crawler is a leader and is aware of what it needs to handle. The failover main leader is equivalent to the controller who takes over the crawler in case of a failure of a crawler system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:
1. A computer system comprising:
a processor; and
memory coupled to the processor and storing instructions that, when executed by the processor, are configurable to cause the computer system to:
identify a pull request (PR) failure, the PR including a software deployment package, wherein the identifying the PR failure includes receiving information associated with the PR from a microservice via an application program interface (API);
identify a system error associated with the PR failure;
determine a failure mitigation process based on the PR failure and the system error; and
execute the failure mitigation process to resolve the PR failure.

2. The computer system of claim 1, wherein the failure mitigation process includes generating and sending an alert associated with the identified system error.

3. The computer system of claim 2, wherein the alert is sent via: a support channel post, a short message service (SMS) text message, an email, or an online incident response service.

4. The computer system of claim 2, wherein the alert includes an indication of a status of the PR, an error type, or an error category.

5. The computer system of claim 4, wherein executing the failure mitigation process includes updating a status of the PR to indicate: the error type, the error category, or an indication of the failure mitigation process.

6. The computer system of claim 1, wherein the failure mitigation process includes re-evaluating the PR failure after a predetermined period of time to determine if the system error is still present.

7. The computer system of claim 1, wherein the PR failure is associated with a conflict between a software code change in the software deployment package and existing software code.

8. The computer system of claim 1, wherein identifying the system error includes determining an expected duration of the system error.

9. The computer system of claim 8, wherein at least a portion of the failure mitigation process is executed based on the expected duration of the system error.

10. The computer system of claim 1, wherein identifying the system error includes querying an internal engineering system for a system failure or incident.

11. The computer system of claim 1, wherein identifying the system error includes mapping the system error to an intermittent failure, and wherein the failure mitigation process includes retrying deployment of the PR using an exponential retry process.

12. The computer system of claim 1, wherein identifying the PR failure includes scanning a first database storing information associated with the PR, and identifying the system error associated with the PR failure includes scanning a second database storing information associated with system-related incidents and outages.

13. The computer system of claim 1, wherein the information associated with the PR includes: an indication of a current processing stage for the PR, or an indication of a failure category associated with the PR failure.

14. The computer system of claim 13, wherein the memory further stores instructions to cause the computer system to receive, via the API, a notification from the microservice subsequent to execution of the failure mitigation process to indicate processing of the PR is completed.

15. The computer system of claim 1, wherein identifying the PR failure includes identifying a microservice in which the PR failure occurred.

16. The computer system of claim 1, wherein the identified system error includes: an Open Container Initiative (OCI) docker exception, an intermittent network connectivity failure, a network bridge failure, or a proxy system failure.

17. The computer system of claim 1, wherein the failure mitigation process includes attempting to retry deployment of the PR based on one or more actions by a user subsequent to the PR failure.

18. A tangible, non-transitory computer-readable medium storing instructions that, when executed by a computer system, are configurable to cause the computer system to:

identify a pull request (PR) failure, the PR including a software deployment package, wherein the identifying the PR failure includes identifying a microservice in which the PR failure occurred;

identify a system error associated with the PR failure;

determine a failure mitigation process based on the PR failure and the system error; and execute the failure mitigation process to resolve the PR failure.

19. A method comprising:

identifying, by a computer system, a pull request (PR) failure, the PR including a software deployment package, wherein the identifying the PR failure includes receiving information associated with the PR from a microservice;

identifying, by the computer system, a system error associated with the PR failure;

determining, by the computer system, a failure mitigation process based on the PR failure and the system error; and executing, by the computer system, the failure mitigation process to resolve the PR failure.

\* \* \* \* \*